United States Patent [19]

Weis

[11] Patent Number: 4,484,496

[45] Date of Patent: Nov. 27, 1984

[54] SERVO DRIVE, PARTICULARLY FOR DRIVING OUTPUT SHAFTS OF SLIDE VALVES

[75] Inventor: Alfred Weis, Olpe, Fed. Rep. of Germany

[73] Assignee: Elektro-Mechanik GmbH, Fed. Rep. of Germany

[21] Appl. No.: 420,315

[22] Filed: Sep. 20, 1982

[30] Foreign Application Priority Data

Sep. 24, 1981 [DE] Fed. Rep. of Germany ....... 3138004

[51] Int. Cl.$^3$ .................. F16H 1/28; F16H 37/06; F16H 3/44
[52] U.S. Cl. ........................... 74/804; 74/661; 74/675; 74/665 C; 74/785
[58] Field of Search ............ 74/804, 805, 661, 665 A, 74/665 B, 665 C, 797, 424.5, 424.7, 425, 674, 675, 679, 793, 768, 769, 785, 788

[56] References Cited

U.S. PATENT DOCUMENTS

| 2,210,240 | 8/1940 | Herrick | 74/675 X |
| 2,508,121 | 5/1950 | McIver | 74/804 |
| 2,940,337 | 6/1960 | Kalb | 74/675 |
| 2,948,165 | 8/1960 | Luthi | 74/804 |
| 3,232,132 | 2/1966 | Yoshikazu et al. | 74/675 X |
| 3,413,896 | 12/1968 | Wildhaber | 74/805 X |
| 4,297,920 | 11/1981 | Richter | 74/804 |

FOREIGN PATENT DOCUMENTS

| 617052 | 8/1935 | Fed. Rep. of Germany | 74/675 |
| 1074243 | 12/1955 | Fed. Rep. of Germany | 74/675 |
| 1048113 | 6/1956 | Fed. Rep. of Germany | 74/675 |

Primary Examiner—Allan D. Herrmann
Assistant Examiner—Stephen B. Andrews
Attorney, Agent, or Firm—McGlew and Tuttle

[57] ABSTRACT

A servo drive for driving an output shaft of a valve comprises a gear housing on which is mounted an electric driving motor which drives an eccentric through back gears. A planetary gear train includes an externally toothed inner gear engaged on the eccentric and driven thereby. The output shaft extends through the eccentric. An internally and an externally toothed outer gear has an internal gear portion and engageable with the external gear of the inner gear and has an outer gear portion engaged with a worm in a fixed self-locking manner. A plurality of wound bolts of equal diameter are arranged in spaced circumferential locations along a first circle around the center of the inner gear and they are spaced from each other by equal lengths of arc which protrude in one axial direction. A perforated disc connected to the output shaft has a disc portion oriented parallel to the inner gear and has a plurality of circumferentially spaced round holes in the same number of the number of bolts. The holes are spaced around a second circle which is of a diameter which is larger than the first diameter in an arrangement such that the round bolts engage through the holes and touch the wall bounding the associated hole. The construction is such that the torque transmitting components, the toothed inner wheel and the internally and externally toothed outer wheel as well as the perforated disc may be arranged in either dual or multiple numbers parallel to the same axis.

2 Claims, 3 Drawing Figures

4,484,496

SERVO DRIVE, PARTICULARLY FOR DRIVING OUTPUT SHAFTS OF SLIDE VALVES

FIELD AND BACKGROUND OF THE INVENTION

The invention relates in general to drive mechanisms and in particular to a new and useful servo drive for valves, slide valves or the like having a planetary gear train construction.

Servo drives with such a planetary gear train, referred to as returning, which is designed as a two-step drive are in use with two internally toothed outer gear wheels, the first of which is also externally toothed and is in engagement with a worm mounted in a gearcase, and the second of which is connected with a carrier plate secured on the output shaft of the gear train, further with two interconnected externally toothed inner wheels which are driven by an eccentric.

A planetary gear train constructed according to the same principle is known in the trade under the designation "The Keystone epi". This planetary gear train has an externally toothed inner wheel mounted on an eccentric by a rolling bearing, and an external toothing, consisting of two toothed rims of different diameters, and likewise has only one internally and externally toothed outer wheel, the external toothing of which meshes with a worm secured on the shaft of a manual drive, while its internal toothing meshes with one of the two toothed rims of the inner wheel. The second rim of the inner wheel is in engagement with the internal toothing of a bowl-shaped carrier plate, which is secured on the output shaft of the gear train and in which the internal toothing is on the inner face of a cylinder ring shaped wall perpendicular to the plate or disc.

In the above described planetary gear trains of the prior art, the inner wheels are, due to their construction, more or less smaller in diameter than the internal toothing of the outer wheels.

In single step gear trains the transmission ratio ü is defined by the ratio of the difference between the number $z_1$ of teeth of the internal toothing of the outer wheel acting directly on the output shaft and the number $z_2$ of the teeth of the external toothing of the inner wheel mounted on the eccentric to the number $z_2$ of teeth of the external toothing of the inner wheel, according to the equation $$U = n_1/n_2 = \frac{z_1 - z_2}{z_2}$$

The above described commercially known two-step gear train, in which the outer wheel is prevented from rotating, has, according to Dubbel, Taschenbuch für den Maschinenbau (Manual of Machine Construction), Berlin, published by Julius Springer, 1935, page 717, a transmission ratio $$J = \frac{r_1 \times r_3}{r_2 \times r_4} - 1$$

where $r_1$ = radius of the internal toothing of the bowl-shaped carrier plate, $r_2$ = radius of the larger toothed rim of the inner wheel, $r_3$ = radius of the smaller toothed rim of the inner wheel, $r_4$ = radius of the internal toothing of the outer wheel.

The radius ratio $r_1/r_2$ and $r_3/r_4$ in pairs of meshing wheels is the same as the ratio $z_1/z_2$ or $z_3/z_4$ of the number of teeth of the respective gears, so that the above relationship for $J = 1/ü$ corresponds to:

$$1/U = \frac{z_1 \times z_3}{z_2 \times z_4} - 1$$

For two-step gear trains it is preferably taken to be large, e.g. in the range of $100 < 1/ü < 1000$.

Also in a planetary gear train according to the above considered prior art, where the cylinder ring shaped wall with internal toothing of the carrier plate may be conceived as replacing a second outer wheel, as shown in FIG. 2, the transmission ratio is large because of the small difference therebetween the diameters of the two rims of the externally toothed inner wheel.

SUMMARY OF THE INVENTION

The invention provides a returning planetary gear train constructed in two steps and with components to provide such a gear train with a reduced transmission ratio using structural elements designed in accordance with the desired degree of reduction instead of existing gear components, which elements and components are readily interchangeable.

The invention provides in a returning gear train, on an externally toothed inner wheel a number of round bolts of equal diameter which are secured standing in a circle around the center of the inner wheel spaced from each other by equal lengths of arc and protruding in one direction. Also included is an output shaft with a perforated disc secured thereto which has a disc portion oriented parallel to the inner wheel with round holes in the same number as the round bolts and has the same size diameter which is greater than the diameter of the round bolts and are arranged in a circle in such a way that the round bolts engage through the holes and touch the edge of the hole.

The gear train created according to the invention is single-step or as called in the following "single-step cyclo-train". By reversal of the interchange it can readily be retransformed into a returning planetary gear train and in this an advantage of the invention is seen.

Proceeding from a returning planetary gear according to the prior art known from the trade with an inner wheel whose external toothing has two toothed rims, only two components, namely one toothed rim of the inner wheel and the said bowl shaped carrier plate with the internal toothing, are replaced by two structural elements according to the invention.

In order to transmit greater forces and torques by means of a so-called one-step cyclo-train, the force transmitting gear wheels, namely the externally toothed outer wheel, and also the perforated plate connected with the inner wheel by round bolts, are advantageously arranged in dual or multiple number as needed, parallel on the same axis.

A more indirect further development includes a one-step cyclo-train with the angle of engagement of the toothing of the inner wheel being approximately 20° according to a given number of teeth thereof, whereas that of the outer wheel is dimensioned and executed according to an added number 1 of the teeth of the respective outer wheel (in comparison with the number of teeth of the inner wheel), and the eccentricity is adapted accordingly. Thereby, in a cyclo-train with an inner wheel having a standard or DIN toothing, the value of the angle of engagement of the teeth of the outer wheel is adapted to the smallest possible difference between the number of teeth thereof and of the inner wheel, and yet the outer wheel can have for example two to ten teeth more than the inner wheel, in order for instance to vary the force transmission through the transmission ratio. Advantageously, therefore, it is not necessary, proceeding from a two step planetary gear train, to change the toothing of the first inner wheel and the latter need not be exchanged.

Accordingly, it is an object of the invention to provide a servo drive for driving and output shaft which comprises a gear housing on which is mounted an electric drive which drives an eccentric through back gears so as to move a planetary gear tray which contains an externally toothed gear engaged over the eccentric and rotatable on the output shaft and which further includes an internally and externally toothed outer gear having an internal gear in engagement with the external gear of the inner gear and has outer gearing portions engaged with a worm mounted in the housing in a fixed self-locking engagement and wherein there are a plurality of round bolts of equal diameter arranged in spaced circumference in a first circle around the inner gear which are spaced from each other by equal lengths of arc and protrude in an axial direction and which engage in round holes defined in a perforated disc connected to the output shaft and having a disc portion oriented parallel to the inner gear with the plurality of holes the same number as the number of bolts spaced around a second circle with the same diameter as the first circle and which is greater than the diameter of the round bolts in such a way that the round bolts engage through the holes and touch the edge of the wall bounding the associated hole.

A further object of the invention is to provide a drive mechanism which is simple in design, rugged in construction and economical to manufacture.

The various feature of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
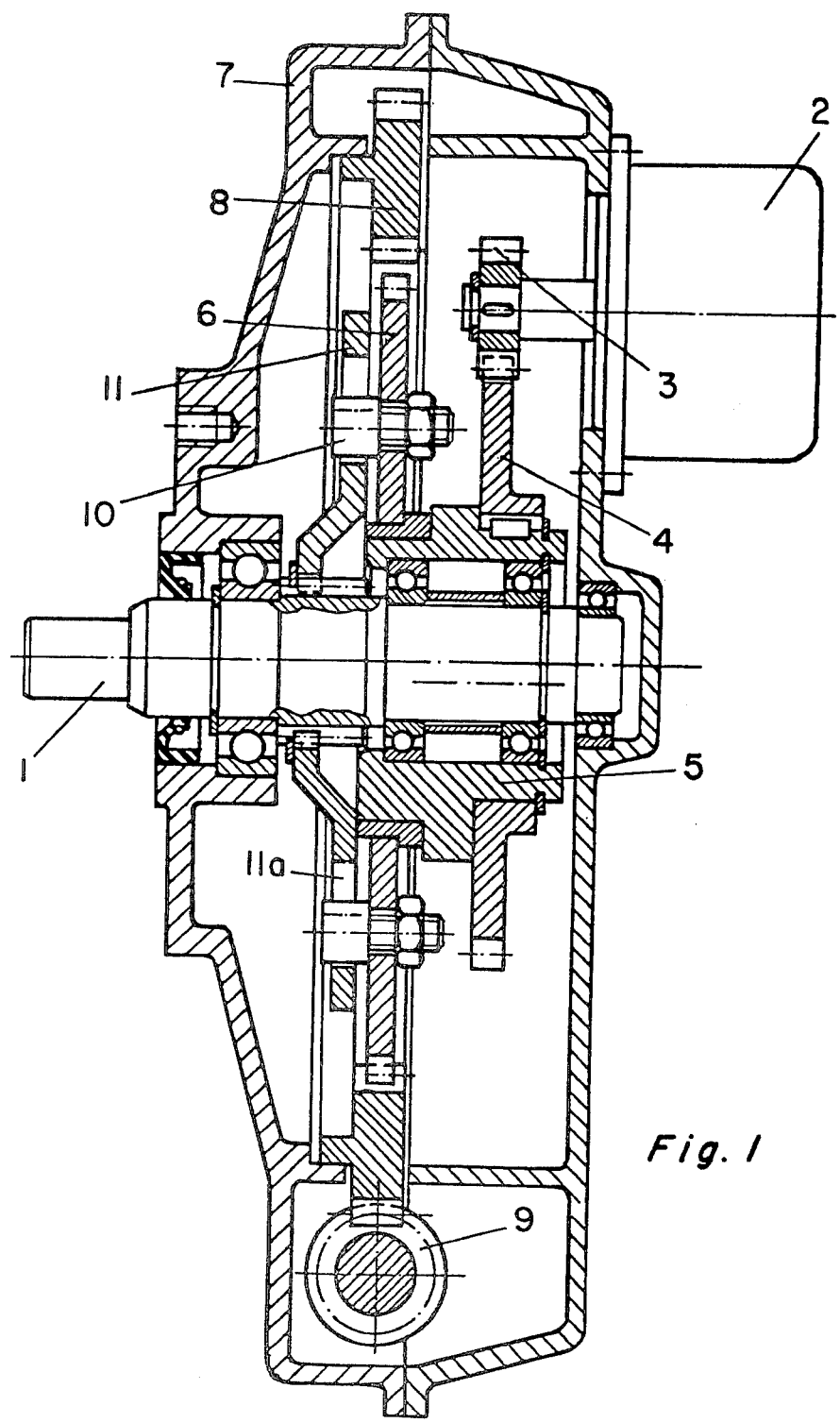
FIG. 1 is substantially an axial sectional view of a one-step cyclo-train drive constructed in accordance with the invention.

Referring to the drawings in particular the invention embodied therein comprises a servo drive for driving the output shaft 1 of a device such as a slide valve or the like which comprises a gear housing 7 with an electric motor 2 mounted thereon which drives the eccentric 5 through a gearing which comprises back gear wheels 3 and 4. The eccentric 5 rotatably carries an externally toothed inner gear 6 of the planetary gearing which also includes an internally and externally toothed outer gear 8 which has an internal gear portion in engagement with the external gear of the inner gear wheel and has an outer gear carrying portion in engagement with a worm 9 which is rotatably mounted in the housing 7 and self-lockingly engages with the outer gear 8. A plurality of round bolts 10 of substantially equal diameters are arranged at spaced circumferential locations around a first circle disposed around the center of the inner gear 6 and spaced from each other by equal lengths of arc. The bolts 10 protrude in one axial direction and they are engaged into openings of round holes 11a provided in a perforated disc 11. The disc 11 includes a disc portion oriented parallel to the inner gear 6 and the round holes are of the same number as the number of bolts 10 that are spaced around a second circle of the same size diameter as the spacings of the centers of the bolts 10. The arrangement is such that the round bolts engage through the holes and touch the edge of the wall bounding the holes 11a.

Figure 2:
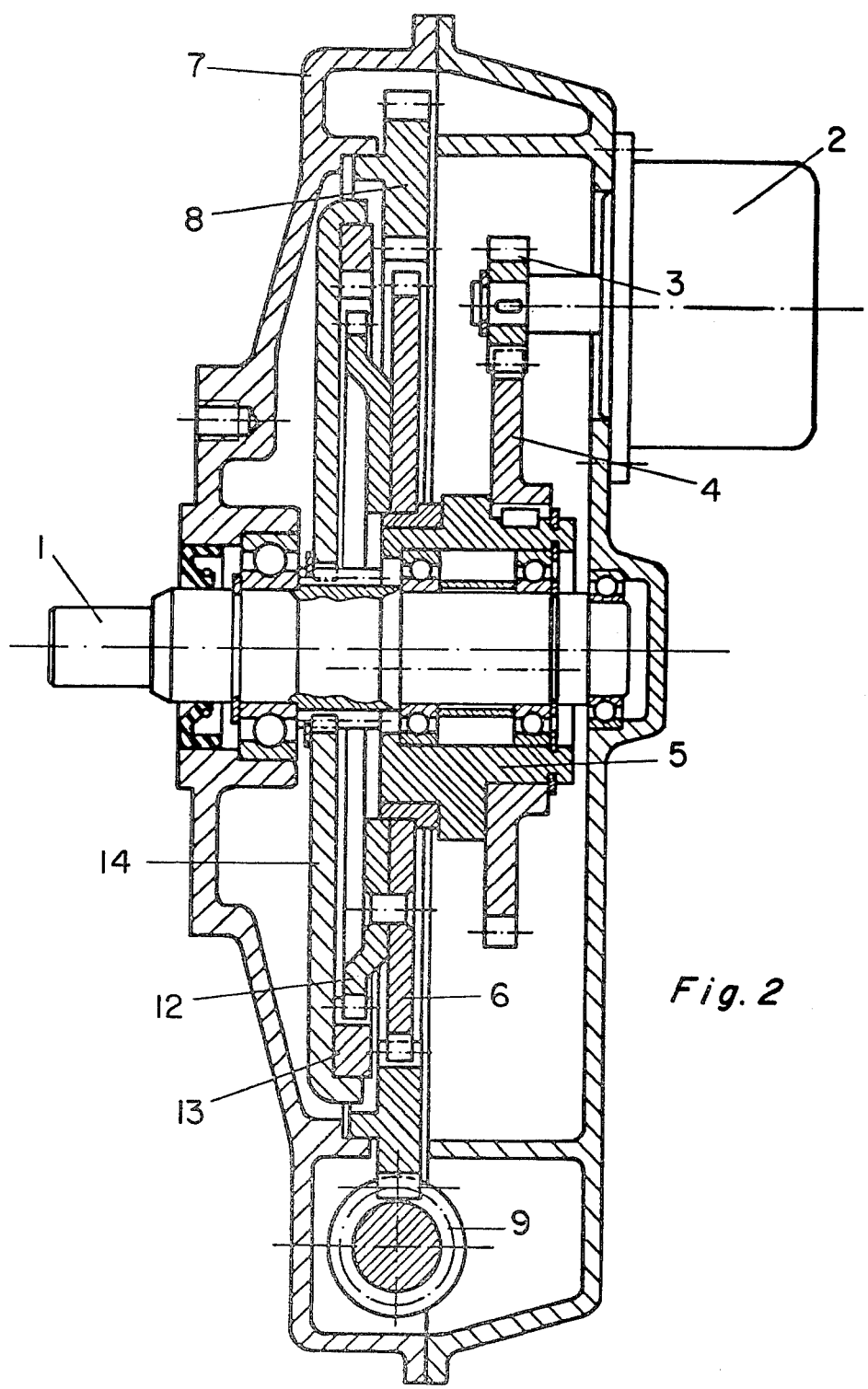
FIG. 2 is a view similar to FIG. 1 in which there are two inner and two outer wheels of the drive shown in FIG. 1.
Figure 3:
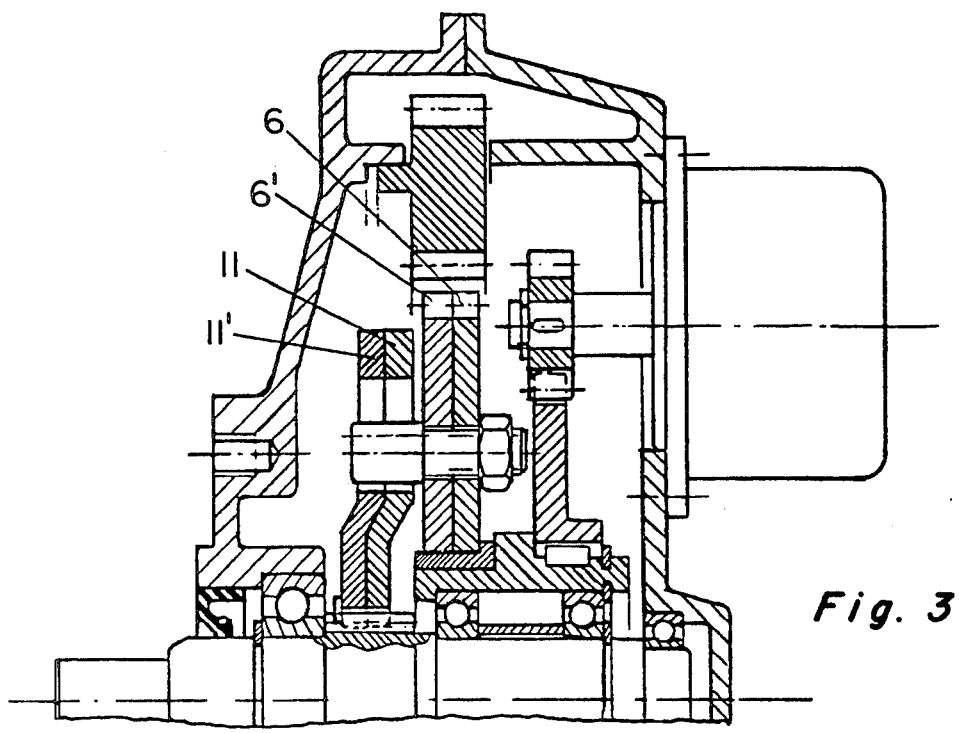
FIG. 3 is a view similar to FIG. 1 and adapted for transmission of a greater torque.

Both of the gear trains are planetary gear trains which, in FIGS. 1 and 2, are represented as an integral part of a servo drive. In FIG. 3 there is shown approximately one half of a one-step cyclo-train.

According to FIGS. 1 and 2, essential components of a servo drive and the components or elements of a planetary gear train are combined in a common housing or gearcase 7. An electric motor 2 with drive shaft drives via two backgear wheels or gears 3 and 4 an eccentric 5 of a planetary gear train. The torque of electric motor is transmitted to the output shaft 1 of the servo drive by means of the planetary gear train. An externally toothed and internally toothed outer gear 8 of the planetary gear train is in self-locking engagement connection with a worm 9 formed on an auxiliary drive shaft of the servo drive. The auxiliary drive shaft may for example be connected with a hand wheel.

The planetary gear train in FIG. 1 is equipped according to the invention with the motor driven eccentric 5 and also an externally toothed inner wheel or gear 6 rotatably mounted, over a bushing shown, on the eccentric 5. The outer gear 8 which is in self-locking engagement connection with the worm 9, a plurality of identical round bolts 10 which are secured on the inner gear 6 and protrude therefrom in one axial direction, and of a perforated disc 11 secured on the output shaft 1 with as many circular holes 11a as there are round bolts which engage thorough the circular holes. The round bolts 10, i.e., the axes of the circular bolts, stand in a circle around the center of the inner wheel 6, the center of gravity of the eccentric, and are spaced from each other on the circle by equal lengths of arc.

The centers of the circular holes 11a in the perforated disc 11 are arranged in a circle. The holes 11a are of equal diameter which is greater than the diameter of the round bolts, the difference between the diameter of the holes and that of the bolts being adapted to the eccentricity of the eccentric (distance of the center of gravity of the eccentric from the axis of rotation thereof). The diameter of the circle on which the holes are arranged and the diameter of the circle on which the bolts stand are of the same size. The two circles are eccentric to each other. The holes in the perforated disc and hence the circle on which they lie arranged so that the bolts touch the holes at the latter's edge (circular hold edge).

The distance between the centers of the two circles represents the eccentricity of the eccentric).

During rotation of the inner wheel with the motor driven eccentric 5, the round bolts roll off the edges of the cylindrical holes, so that the perforated disc 11 and the output shaft 1 are rotated in an opposite direction at a speed reduced relative to the inner gear 6 as a function of the eccentricity of the eccentric. In the above described planetary gear train, illustrated in FIG. 1, the ratio of the speed reduction corresponds to the transmission ratio, which is determined by the difference between the number of teeth of the outer gear 8 blocked by self-locking and the number of teeth of the inner wheel 6, existing between the blocked outer wheel and the output shaft 1, according to the equation $ü = z_1/z_2 - 1$. The planetary gear wheels 6 and 8 involved form only one gear step, in which the transmission ratio can readily be adjusted smaller than 100.

Incidentally, a planetary gear train according to FIG. 1 is advantageous because of the fact that only one planetary gear wheel of the gear step, namely the inner wheel 6, lies in the path of the flow of force to the output shaft. The inner wheel 6, the round bolts 10 on the inner wheel, and the perforated disc 11 are the force or torque-transmitting components of the one step planetary gear train, called one-step cyclo-train. The term "cyclo-train" characterizes in general a gear train system in which as main element a disc similar to the perforated disc 11 having circular holes 11a and cooperating with rolls on round bolts, is used instead of gears. The movements of the main elements of such transmissions are rolling and hence have little friction. In the planetary gear train called above "one-step cyclo-train" (FIG. 1) round bolts 10 and the perforated disc 11 are used besides the inner wheel 6 and outer wheel 8 owing to which this gear train is lower in friction than for instance a returning planetary gear train consisting exclusively of gears.

A one-step cyclo-gear according to FIG. 1, having a desired low transmission ratio ü, e.g. ü=50, can readily be produced from a given planetary gear train of high transmission ratio of known kind, for example from a two-step so-called returning planetary gear train, shown in FIG. 2, in which similar parts are similarly numbered. In it, an externally toothed inner wheel or gear 6 is mounted on an eccentric 5 and an internally and externally toothed outer wheel or gear 8 is in engagement on the outside with a worm 9 mounted in the housing 7 and form a first gear step. Firmly connected with the inner wheel 6 is a smaller second inner wheel or gear 12, which by its external toothing is in engagement with an outer wheel 13 toothed only internally and which on the outside is connected with a carrier plate 14 which in turn form a second gear step, which acts directly on the output shaft. Here the gear wheels 6,12,13 of both gear steps and the plate 14 are all force transmitting components of the gear train.

By replacing the inner wheel 12 by e.g. six unilaterally protruding round bolts secured on the inner wheel 6, which are arranged like the round bolts 10 in FIG. 1, and by further replacing the outer wheel 13 and carrier plate 14 by a perforated disc with circular holes secured on the output shaft 1, the round bolts passing through the holes as shown in FIG. 1, or respectively by interchanging these parts, a one-step cyclo-train according to FIG. 1 is thereby created having a reduced transmission ratio which is fixed by the different number of teeth of the inner wheel 6 and the unchanged number of teeth of the outer wheel 8. By reversal of these measures, the cyclo- train can be transformed, as needed, into a two-step planetary gear train with high transmission ration.

A planetary gear train and specifically a one-step cyclo-train can be fitted for the transmission of a several times greater torque from the eccentric to the output shaft, as the force and torque transmitting components can be arranged in a corresponding multiple number parallel to each other on a common axis. For example, a so-called one-step cyclo-train as shown in FIG. 3 for the transmission of a double torque is equipped with two parallel (coaxial) inner wheels 6,6' which are mounted jointly on the eccentric 5 and are in engagement on the outside with the internal toothing of a reinforced outer wheel 8, and with two likewise parallel, congruent perforated discs 11,11' which are jointly secured on the output shaft. The number of round bolts is unchanged, but they are of a corresponding length, as they pass through the two inner wheels 6,6' and protrude on one major face of 6' far enough that each round bolt engages through two holes aligned one behind the other of the two perforated discs 11,11'.

The multiple arrangement of force-transmitting components is of importance also for reasons of economical manufacture. Thus planetary gear wheels and perforated discs can be stamped from sheet metal and can be arranged according to the sheet thickness and according to the torques and forces to be transmitted, in multiple number, parallel and coaxial to each other.

Lastly with respect to the size of the engagement angle of the planetary gear wheels of a gear train according to FIG. 1, it is possible, as has been explained above, to vary the transmission ratio for the purpose of changing the force transmission while using an inner wheel 6 of standard toothing, i.e. with an engagement angle beta approximately 20° according to German standards and with a given number of teeth, and with an outer wheel in which the engagement angle beta of the internal toothing is dimensioned and executed according to the smallest possible difference 1 between the number of teeth of the outer wheel 8 and of the inner wheel 6. Expediently this is done by varying the mentioned difference in the number (added number) of teeth. The range of variation of the added number and difference $z_2 - z_1$ of the teeth may be between 1 and 10.

In explanation of the foregoing let it be noted here as a concluding remark that the engagement angle and hence, as is known, the form of the toothing is dependent on this added number and difference of the teeth, being about 45° for the added number 1, in any event more than 30° at a small added number (2 or 3), and about 20° (corresponding to German standard) at a greater added number of teeth.

While specific embodiments of the invention have been shown and described in detail to illustrate the application of the principles of the invention, it will be understood that the invention may be embodied otherwise without departing from such principles.

What is claimed is:

1. A servo drive for driving an output shaft for valves and similar devices, comprising:
   a gear housing;
   drive means mounted on said housing;
   an eccentric driven by said drive means and being rotatable around the output shaft;
   a planetary gear train including said eccentric with an externally toothed inner gear mounted on said eccentric and driven thereby;

an internally and externally toothed outer gear having an internal gear portion in engagement with said inner gear and having an outer gear portion;

a worm rotatably mounted in said housing and self-lockingly engaged with said outer gear portion of said internally and externally toothed outer gear;

a plurality of round bolts of equal diameter arranged in spaced circumferential locations in a first circle around a center of said inner gear and being spaced from each other by equal lengths of arc, said bolts protruding in one axial direction from said inner gear; and a perforated disc connected to the output shaft and having a disc portion oriented parallel to said inner gear with a plurality of circumferentially spaced round holes of the same number as said round bolts and spaced around a second circle of the same size as said first circle and of a greater diameter than said round bolts, said round bolts engaging through said holes and touching edges of said perforated disc bounding said holes, said output shaft being rotatably mounted to said gear housing about a center of rotation, said drive means comprising a motor connected to said housing at a location spaced from said center of rotation, a first drive gear connected to said motor for rotation by said motor, a second drive gear connected to said eccentric and meshed with said first drive gear for rotation of said eccentric by rotation of said motor, said worm being connected to said housing at a location spaced further from said center of rotation than a spacing between said center of rotation and said motor, said worm holding said outer gear fixed when said worm is not rotated and rotating said outer gear when said worm is rotated so that said output shaft can be rotated by one of said motor and said worm.

2. A servo drive according to claim 1, wherein said first gear has a smaller diameter and fewer teeth than said second gear, said internal gear portion and said outer gear portion of said outer gear being radially aligned with each other in a radial direction with respect to said center of rotation and being larger in diameter and having a larger number of teeth than said second gear.

* * * * *